(12) United States Patent
Fu

(10) Patent No.: US 9,786,179 B2
(45) Date of Patent: Oct. 10, 2017

(54) METHOD AND DEVICE FOR ASSISTING A DRIVER OF A VEHICLE DURING A LANE CHANGE

(71) Applicant: Robert Bosch GmbH, Stuttgart (DE)

(72) Inventor: Chengxuan Fu, Kirchheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 44 days.

(21) Appl. No.: 14/969,985

(22) Filed: Dec. 15, 2015

(65) Prior Publication Data

US 2016/0180714 A1 Jun. 23, 2016

(30) Foreign Application Priority Data

Dec. 22, 2014 (DE) ........................ 10 2014 226 743

(51) Int. Cl.
*B60W 30/12* (2006.01)
*G08G 1/16* (2006.01)
*B62D 15/02* (2006.01)

(52) U.S. Cl.
CPC ........... *G08G 1/167* (2013.01); *B62D 15/025* (2013.01); *B62D 15/0255* (2013.01)

(58) Field of Classification Search
CPC .. G08G 1/167; B62D 15/025; B62D 15/0255; B62D 15/029; B60T 2201/08; B60T 2201/087; B60T 2260/02; B60W 30/12; B60W 10/20; B60W 2710/20; B60W 2510/202; B60W 2710/202; B60W 40/114
USPC ......... 701/41, 302, 36, 408; 340/436, 425.5, 340/475

See application file for complete search history.

(56) References Cited

U.S. PATENT DOCUMENTS

| | | | |
|---|---|---|---|
| 7,233,848 B2 * | 6/2007 | Braeuchle .......... | B62D 15/0255 340/475 |
| 7,363,140 B2 * | 4/2008 | Ewerhart ............ | B60W 30/143 701/70 |
| 9,208,975 B2 * | 12/2015 | Mizuno .................. | B60Q 1/343 |

\* cited by examiner

*Primary Examiner* — Dalena Tran
(74) *Attorney, Agent, or Firm* — Norton Rose Fulbright US LLP; Gerard Messina

(57) ABSTRACT

A method for assisting a driver of a vehicle during a lane change, in which for this purpose, an activation signal which represents an activation of a turn signal of the vehicle, which faces a setpoint direction of travel, and a sensor signal which is provided by at least one sensor of the vehicle and which represents a steering movement for steering the vehicle and/or a change in position of the vehicle within a lane are read in. Using the activation signal and the sensor signal, a control signal for controlling a steering system of the vehicle is provided if the steering movement is counter to the setpoint direction of travel and/or the change in position represents a movement of the vehicle in a direction counter to the setpoint direction of travel.

7 Claims, 2 Drawing Sheets

METHOD AND DEVICE FOR ASSISTING A DRIVER OF A VEHICLE DURING A LANE CHANGE

RELATED APPLICATION INFORMATION

The present application claims priority to and the benefit of German patent application no. 10 2014 226 743.9, which was filed in Germany on Dec. 22, 2014, the disclosure of which is incorporated herein by reference.

FIELD OF THE INVENTION

The present invention relates to a method for assisting a driver of a vehicle during a lane change, to a corresponding device and to a corresponding computer program.

BACKGROUND INFORMATION

Lane-keeping assistance systems for motor vehicles may include a function for generating a steering torque in order to assist a driver when guiding his vehicle within a lane. This function is usually switched off when a turn signal is activated.

SUMMARY OF THE INVENTION

Against this background, the concept presented here provides a method for assisting a driver of a vehicle during a lane change, and also a device which uses this method, and finally a corresponding computer program, as recited in the main descriptions herein. Advantageous embodiments result from the respective sub-descriptions herein and the description below.

The concept presented here provides a method for assisting a driver of a vehicle during a lane change, the method including the following steps:

reading in an activation signal which represents an activation of a turn signal of the vehicle, which is facing a setpoint direction of travel, and a sensor signal which is provided by at least one sensor of the vehicle and which represents a steering movement for steering the vehicle and/or a change in position of the vehicle within a lane; and providing a control signal for controlling a steering system of the vehicle using the activation signal and the sensor signal if the steering movement is counter to the setpoint direction of travel and/or the change in position represents a movement of the vehicle in a direction counter to the setpoint direction of travel.

A vehicle may be understood to mean a motor vehicle such as, for example, a passenger car or a commercial vehicle. A lane may be understood to mean a traffic lane of a roadway along which the vehicle is traveling. The lane may be delimited on one or both sides by a lane boundary, for example in the form of a marking or another vehicle. A lane change may be understood to mean a driving maneuver associated with a change of the lane. In particular, the lane change may be intentional and may be signaled by activating a corresponding turn signal. A setpoint direction of travel may be understood to mean a direction of travel into which the vehicle is to be steered during the lane change. A turn signal may be understood to mean, for example, a flashing direction indicator. A sensor may be, for example, a surroundings sensor or a steering wheel sensor. A steering movement may be understood in general to mean an actuation of a steering system of the vehicle, such as a movement of a steering wheel for example, which is associated with a change in a steering angle. A direction counter to the setpoint direction of travel may be, for example, a direction which is essentially opposed to a direction symbolized by the activated turn signal.

The concept provided here is based on the finding that a lane-keeping assistance system of a vehicle may be configured to assist a driver as a function of an actuation of the turn signal during the lane change.

The driver often is not able to change the lane immediately upon activating the turn signal. While the driver is waiting for a suitable opportunity, it may happen that he inadvertently steers in a direction deviating from the indicated direction, for example because he is no longer able to concentrate so well on the course of his own lane when looking in the side mirror or when looking over his shoulder. In this case, it may happen that he carries out an unintentional steering movement in the wrong direction.

Due to the intervention of the lane-keep assistance system to correct the steering operation even when the turn signal is activated, the unintentional steering movement during the lane change may be counteracted in good time. As a result, the risk of an accident associated with a lane change may be reduced.

According to one specific embodiment, in the step of providing, the control signal may be provided in order to generate a steering torque counter to the steering movement and, additionally or alternatively, to the movement of the vehicle. By applying the steering torque to the steering wheel, for example, it is possible to make the driver effectively aware of his driving error without distracting him too much from the traffic situation.

It is furthermore advantageous if, in the step of providing, the control signal is provided if the change in position represents an approach of the vehicle to a lane boundary of the lane, which faces away from the setpoint direction of travel. As a result, an inadvertent deviation from the course during the lane change may be detected in a reliable and accurate manner.

It is particularly advantageous if, in the step of providing, the control signal is provided when the vehicle falls short of a predefined distance for the lane boundary during the approach. The predefined distance may be, for example, between 1 m and 10 cm. As a result, it is possible to provide the control signal before the vehicle crosses the lane boundary. With the aid of the distance, a tolerance range may also be established, i.e., an area within the lane in which the vehicle may be steered in a direction counter to the setpoint direction of travel without the control signal being provided as a result. In this way, a premature intervention into a steering operation may be prevented.

The concept presented here also provides a device which is configured to carry out, activate or implement, in suitable units, the steps of a variant of a method presented here. The object on which the present invention is based may also be achieved quickly and efficiently by this embodiment variant of the present invention in the form of a device.

In the present case, a device may be understood to mean a piece of electrical equipment which processes sensor signals and outputs control signals and/or data signals as a function thereof. The device may have an interface which may be provided as hardware and/or software. In a hardware design, the interfaces may be, for example, part of a so-called system ASIC which contains a wide range of functions of the device. However, it is also possible that the interfaces are dedicated integrated circuits or may be made up at least partially of discrete components. In a software design, the interfaces may be software modules which are present, for example, on a microcontroller alongside other software modules.

Also of advantage is a computer program product or computer program including program code which may be stored on a machine-readable carrier or storage medium, such as a semiconductor memory, a hard drive memory or an optical memory, and is used to carry out, implement and/or activate the steps of the method according to one of the specific embodiments described above, in particular when the program product or program is executed on a computer or a device.

The concept presented here will be explained in greater detail below by way of example and with reference to the appended drawings.

DETAILED DESCRIPTION

Figure 1:
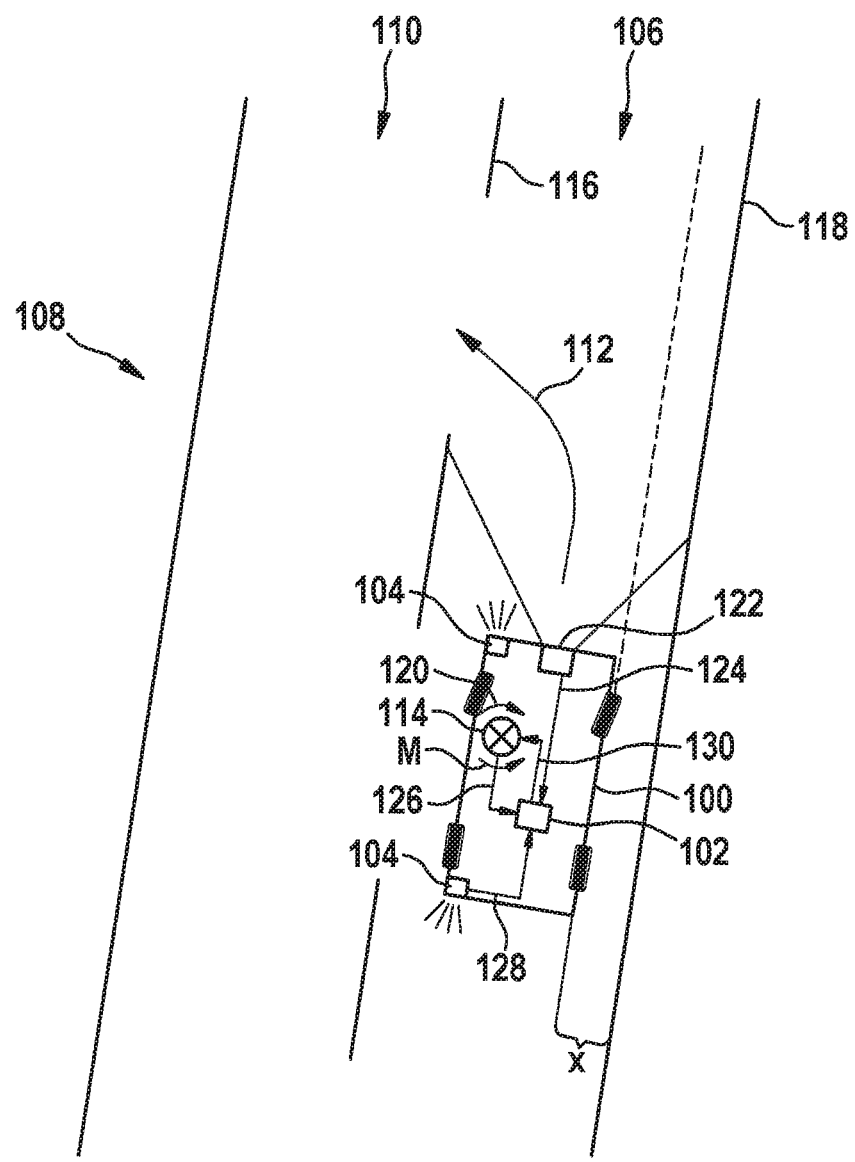
FIG. 1 shows a schematic representation of a vehicle including a device according to one exemplary embodiment of the present invention during a lane change.

In the following description of advantageous exemplary embodiments of the present invention, identical or similar reference numerals will be used for the similarly acting elements shown in the various figures, a repeated description of these elements being omitted.

FIG. 1 shows a schematic representation of a vehicle 100 including a device 102 according to one exemplary embodiment of the present invention during a lane change. Vehicle 100 is traveling with an activated left-hand turn signal 104 on a right-hand lane 106 of a two-lane roadway 108. A driver of vehicle 100 intends to change from right-hand lane 106 to a left-hand lane 110. A setpoint direction of travel 112 corresponding to the lane change is indicated by an arrow. In the process, he moves a steering wheel 114, for example accidentally, in a direction away from setpoint direction of travel 112, so that the vehicle 100 is traveling toward a right-hand lane boundary 118 of lane 106 instead of toward a left-hand lane boundary 116 of lane 106, here by way of example a central strip of roadway 108. Such a steering movement 120 of the driver is likewise indicated by an arrow.

In this exemplary embodiment, vehicle 100 is equipped with a surroundings sensor 122 which is used to detect a position or a change in position of vehicle 100 within right-hand lane 106. Surroundings sensor 120 is configured to generate a surroundings sensor signal 124 representing the position or the change in position and to transmit this to device 102. Furthermore, a steering wheel sensor (not shown here) of vehicle 100 is configured to generate a steering wheel sensor signal 126 representing steering movement 120 and to transmit this to device 102. Turn signal 104 is also coupled to device 102 in order to transmit to device 102 an activation signal 128 which represents a switched-on state of turn signal 104.

In response to receiving activation signal 128, device 102 processes the two sensor signals 124, 126. If device 102 detects with the aid of steering wheel sensor signal 126 that steering movement 120 is counter to setpoint direction of travel 112, as is the case in FIG. 1, and if the processing of surroundings sensor signal 124 shows that vehicle 100 is moving in a direction counter to setpoint direction of travel 112, here in the direction of right-hand lane boundary 118, then device 102 provides a control signal 130 which, in this exemplary embodiment, is used to apply to steering wheel 114 a steering torque M counter to steering movement 120 and thus to an approaching movement of vehicle 100 toward right-hand lane boundary 118. With the aid of steering torque M, the driver is notified in good time about his inadvertent steering error during the lane change.

Alternatively, it is possible that device 102 provides control signal 130 on the basis of just one of the two sensor signals 124, 126.

Surroundings sensor 122 is configured, for example, to detect a distance of vehicle 100 from right-hand lane boundary 118 and to transmit this in the form of surroundings sensor signal 124 to device 102. Accordingly, device 102 may be configured to provide control signal 130 as a function of the detected distance. According to one exemplary embodiment, device 102 provides control signal 130 if the detected distance falls below a predefined minimum distance x, as shown schematically in FIG. 1. Minimum distance x ensures that control signal 130 is provided before vehicle 100 crosses right-hand lane boundary 118. The driver thus has sufficient time to steer vehicle 100 back into the correct direction.

According to one exemplary embodiment, device 102 is implemented as a component of a lane-keeping assistance system of vehicle 100. If the driver has activated a lane keeping mode of the lane-keeping assistance system, also known as a lane departure prevention system, then device 102, when turn signal 104 is activated, enables only that side of lane 106 in which the driver wishes to travel in accordance with the direction indicated by turn signal 104. If the driver indicates to the left and at the same time steers to the left, no lane keeping assist torque, or steering torque M for short, is output by device 102. If, on the other hand, vehicle 100 when indicating to the left travels not to the left but rather to the right, then, as described above, steering torque M will be output since the actual direction of travel does not coincide with the driver's intention.

If the driver has selected a center guiding mode, then the steering torque is usually switched off immediately when a turn signal is activated, so that the driver is given full control of the vehicle. According to one exemplary embodiment, instead of this, an internal changeover to the lane keeping mode described above takes place, so that once again only a side facing a setpoint direction of travel is enabled.

In addition, it is possible to select a lower intervention threshold for the lane keeping mode. As a result, steering torque M may be output earlier if vehicle 100 is drifting to the wrong side, for example before the vehicle touches lane marking 118. The driver thus accordingly notices earlier that he is steering in the wrong direction, and may thus also react earlier.

Figure 2:
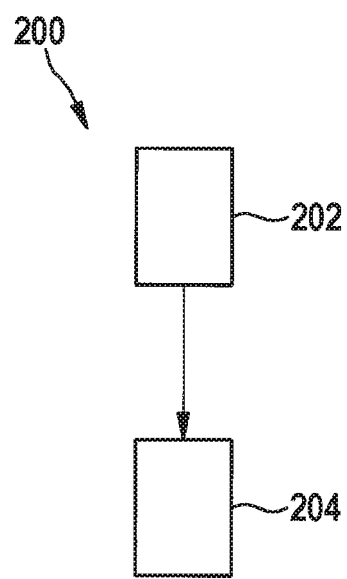
FIG. 2 shows a flow chart of a method according to one exemplary embodiment of the present invention.

FIG. 2 shows a flow chart of a method 200 according to one exemplary embodiment of the present invention. Method 200 for assisting a driver of a vehicle during a lane change may be carried out, for example, by a device as described with reference to FIG. 1. Method 200 begins with a step 202 in which an activation signal, which represents an activation of a turn signal of the vehicle facing toward the setpoint direction of travel, and a sensor signal, which is provided by at least one sensor of the vehicle and which, depending on the specific embodiment, represents a steering movement for steering the vehicle or a change of position of the vehicle within a lane, are read in. Subsequently, in a step 204, a control signal for controlling a steering system of the vehicle is provided if the sensor signal represents a steering movement counter to the setpoint direction of travel. Depending on the specific embodiment, in step 204 the control signal is provided if the sensor signal additionally or alternatively represents a change in position indicating a movement of the vehicle in a direction counter to the setpoint direction of travel, for example in the direction of a lane boundary facing away from the setpoint direction of travel. The control signal is used, for example, to apply to the steering system a steering torque counter to the steering movement or to the movement of the vehicle.

The exemplary embodiments described herein and shown in the figures are selected only by way of example. Different exemplary embodiments may be combined with one another entirely or with respect to individual features. One exemplary embodiment may also be supplemented by features of another exemplary embodiment.

Furthermore, the method steps presented here may be carried out repeatedly and in an order different from the order described.

If an exemplary embodiment includes an "and/or" linkage between a first feature and a second feature, this is to be interpreted to mean that the exemplary embodiment according to one specific embodiment has both the first feature and the second feature and according to another specific embodiment has either only the first feature or only the second feature.

What is claimed is:

1. A method for assisting a driver of a vehicle during a lane change, the method comprising:
   reading in, by processing circuitry of a vehicle, an activation signal that represents an activation of a turn signal of the vehicle indicating an intention of the driver to steer the vehicle in a setpoint direction of travel, and a sensor signal that is provided by at least one sensor of the vehicle and that represents at least one of a steering movement for steering the vehicle and a change in position of the vehicle within a lane;
   determining, by the processing circuitry, that the at least one of the steering movement and the change in position is in a direction counter to the setpoint direction of travel; and
   responsive to and conditional upon the determination, the processing circuitry triggering a steering device to shift the vehicle laterally in a direction consistent with the setpoint direction of travel.

2. The method of claim 1, wherein the steering device, in response to the triggering, generates a steering torque counter to the at least one of the steering movement and to the change in position of the vehicle.

3. The method of claim 1, wherein the triggering is performed in response to a determination that the change in position includes an approach of the vehicle to a lane boundary of the lane, facing away from the setpoint direction of travel.

4. The method of claim 3, wherein the triggering is performed conditional upon that, during the approach, a distance of the vehicle from the lane boundary is determined by the processing circuitry to fall short of a predefined threshold distance.

5. A system of a vehicle for assisting a driver of the vehicle during a lane change, comprising:
   a steering device;
   a turn signaling device;
   at least one sensor; and
   a control unit including processing circuitry, wherein the processing circuitry is configured to:
      read in an activation signal that represents an activation, via an operation of the turn signaling device, of a turn signal of the vehicle indicating an intention of the driver to steer the vehicle in a setpoint direction of travel, and a sensor signal that is provided by the at least one sensor and that represents at least one of a steering movement for steering the vehicle and a change in position of the vehicle within a lane;
      determine that the at least one of the steering movement and the change in position is in a direction counter to the setpoint direction of travel; and
      responsive to and conditional upon the determination, trigger the steering device to shift the vehicle laterally in a direction consistent with the setpoint direction of travel.

6. A non-transitory computer readable medium on which are stored instructions that are executable by a processor of a steering system of a vehicle and that, when executed by the processor, cause the processor to perform a method for assisting a driver of the vehicle during a lane change, the method comprising:
   reading in an activation signal that represents an activation of a turn signal of the vehicle indicating an intention of the driver to steer the vehicle in a setpoint direction of travel, and a sensor signal that is provided by at least one sensor of the vehicle and that represents at least one of a steering movement for steering the vehicle and a change in position of the vehicle within a lane;
   determining that the at least one of the steering movement and the change in position is in a direction counter to the setpoint direction of travel; and
   responsive to and conditional upon the determination, triggering a steering device to shift the vehicle laterally in a direction consistent with to the setpoint direction of travel.

7. The computer readable medium of claim 6, wherein the steering device, in response to the triggering, generates a steering torque counter to the at least one of the steering movement and to the change in position of the vehicle.

* * * * *